US012222806B2

(12) United States Patent
Sforzin et al.

(10) Patent No.: US 12,222,806 B2
(45) Date of Patent: Feb. 11, 2025

(54) CACHE LINE DATA PROTECTION

(71) Applicant: Micron Technology, Inc., Boise, ID (US)

(72) Inventors: Marco Sforzin, Cernusco sul Naviglio (IT); Paolo Amato, Treviglio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/215,588

(22) Filed: Jun. 28, 2023

(65) Prior Publication Data

US 2024/0004759 A1 Jan. 4, 2024

Related U.S. Application Data

(60) Provisional application No. 63/357,508, filed on Jun. 30, 2022.

(51) Int. Cl.
| | | |
|---|---|---|
| G06F 11/10 | (2006.01) | |
| G06F 3/06 | (2006.01) | |
| G06F 12/0868 | (2016.01) | |
| H04L 67/568 | (2022.01) | |

(52) U.S. Cl.
CPC ........ *G06F 11/1076* (2013.01); *G06F 3/0619* (2013.01); *G06F 3/0689* (2013.01); *G06F 11/1048* (2013.01); *G06F 12/0868* (2013.01); *G06F 2211/1009* (2013.01); *G06F 2211/109* (2013.01); *G06F 2212/262* (2013.01); *G06F 2212/282* (2013.01); *G06F 2212/403* (2013.01); *H04L 67/568* (2022.05)

(58) Field of Classification Search
CPC ............... G06F 11/1076; G06F 3/0689; G06F 12/0868; G06F 2212/262; G06F 3/0619; G06F 2211/1009; G06F 2211/109; G06F 2212/282; G06F 2212/403; G06F 11/1048; H04L 67/568
See application file for complete search history.

(56) References Cited

U.S. PATENT DOCUMENTS

| | | | |
|---|---|---|---|
| 11,314,594 B2 * | 4/2022 | Tang | G06F 11/1092 |
| 11,687,273 B2 | 6/2023 | Confalonieri et al. | |
| 2020/0159621 A1 * | 5/2020 | Velayuthaperumal | G06F 3/064 |
| 2021/0359704 A1 * | 11/2021 | Chen | G06F 11/1004 |

OTHER PUBLICATIONS

U.S. Appl. No. 17/831,433, filed Jun. 2, 2022, titled "Write Command Execution for Data Protection and Recovery Schemes", 42 pages.

* cited by examiner

*Primary Examiner* — April Y Blair
*Assistant Examiner* — Sazzad Hossain
(74) *Attorney, Agent, or Firm* — Brooks, Cameron & Huebsch, PLLC

(57) ABSTRACT

Data protection with error correction/detection capabilities can be provided on a cache line basis. When provided on a cache line basis to collectively protect the cache line data, the error correction/detection capabilities can be provided with fewer number of bits (e.g., error correction code (ECC) and/or cyclic redundancy check (CRC) bits) as compared to providing the same error correction/detection capabilities individually on a subset of the cache line data.

20 Claims, 8 Drawing Sheets

CACHE LINE DATA PROTECTION

PRIORITY INFORMATION

This application claims the benefit of U.S. Provisional Application No. 63/357,508, filed on Jun. 30, 2022, the contents of which are incorporated herein by reference.

TECHNICAL FIELD

The present disclosure relates generally to semiconductor memory and methods, and more particularly, to apparatuses, systems, and methods for cache line data protection.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
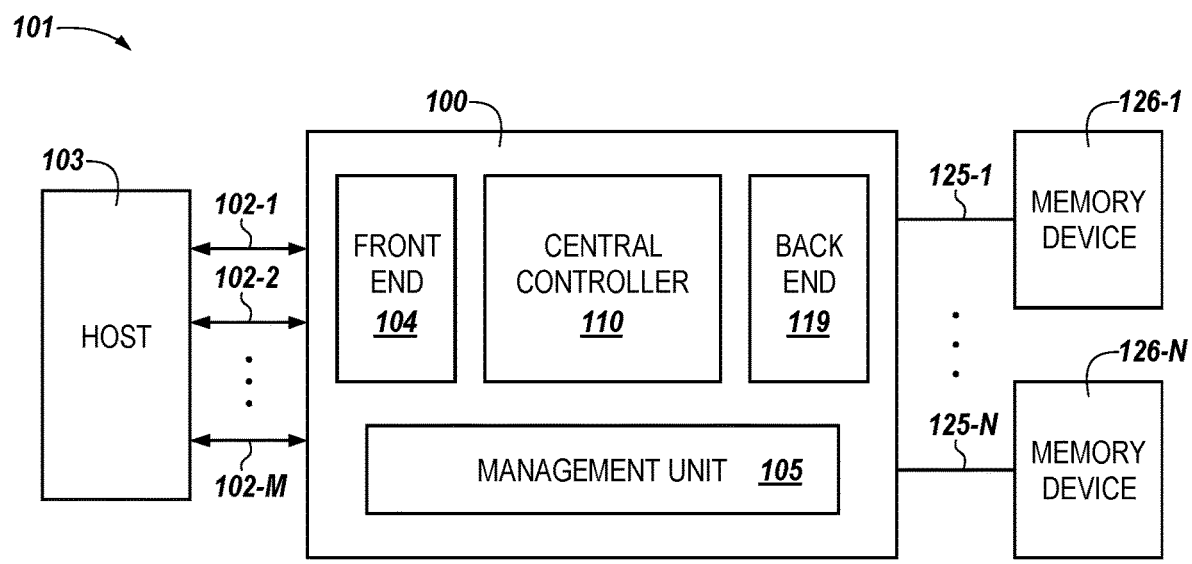
FIG. 1 is a functional block diagram of a computing system including a memory controller for cache line data protection in accordance with a number of embodiments of the present disclosure.

Systems, apparatuses, and methods related to cache line data protection are described. Data protection and recovery schemes are often an important aspect of RAS (Reliability, Availability, and Serviceability) associated with memory systems. Such schemes may provide a "chip kill", in which the memory system can work properly even if a constituent chip, such as a memory die, is damaged; thereby, avoiding a situation of one of the chips being a single point of failure (SPOF) of the memory system. Often, the chip kill capability is provided through various error correction code (ECC) schemes including a "Redundant Array of Independent Disks" (RAID) scheme, a low-power chip kill (LPCK) scheme, etc., which allow data recovery of the damaged chip by reading all of the constituent chips of the memory system.

Embodiments are directed to providing additional error correction and detection capabilities (that operate in conjunction with the chip kill capability) on a cache line basis. For example, data bits that are designed to provide the error correction and detection capabilities can be generated based on a chunk of data corresponding to a cache line size as compared to generating the same on a memory chip (e.g., including one or more memory dice) and/or memory die basis, which results in a fewer number of bits (while providing a same degree of error correction and detection capability). For example, consider a cache line including a chunk of data having 256 bytes, which are to be stored in separate memory chips in a 64-byte chunk each. While merely 27 bits of error correction information might be sufficient to provide a double-error-correction and triple-error-detection (DECTED) capability collectively for 256 bytes of user data, it might require 21 bits of error correction information for providing the same DECTED capability individually for each chunk of 64 bytes, which amounts to 84 bits (e.g., 21 bits*4=84 bits, which is 57 more bits compared to 27 bits) for 256 bytes.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.) and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as elements 102. As used herein, the designators "M" and "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a functional block diagram of a computing system 101 including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . , 126-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port.

In some embodiments, the memory controller 100 can be a compute express link (CXL) compliant memory controller. The host interface (e.g., the front end portion 104) can be managed with CXL protocols and be coupled to the host 103 via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

The central controller portion 110 can include and/or be referred to as data management circuitry. The central controller portion 110 can control, in response to receiving a request from the host 103, performance of a memory operation. Examples of the memory operation include a read operation to read data from a memory device 126 or a write operation to write data to a memory device 126.

The central controller portion 110 can generate error detection information and/or error correction information based on data received from the host 103. The central controller portion 110 can perform error detection operations and/or error correction operations on data received from the host 103 or from the memory devices 126.

As used herein, the term "error correction information" refers to information that can be used to correct a number of errors within data. More particularly, the error correction information can identify which bit of the data corresponds to an "error" (e.g., needs to be error-corrected). Further, as used herein, the term "error correction operation" refers to an operation to correct one or more errors within data. In a number of embodiments, the error correction operation can be performed using the error correction information.

As used herein, the term "error detection information" refers to information that can be used to indicate whether data has one or more errors or not, which may not further indicate which bit position of the data needs to be error-corrected. Further, as used herein, the term "error detection operation" refers to an operation to indicate whether data has one or more errors. In a number of embodiments, the error detection operation can be performed using the error detection information; therefore, the error detection operation performed on the data may not precisely indicate which bit of the data needs to be error-corrected.

An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data.

Figure 2:
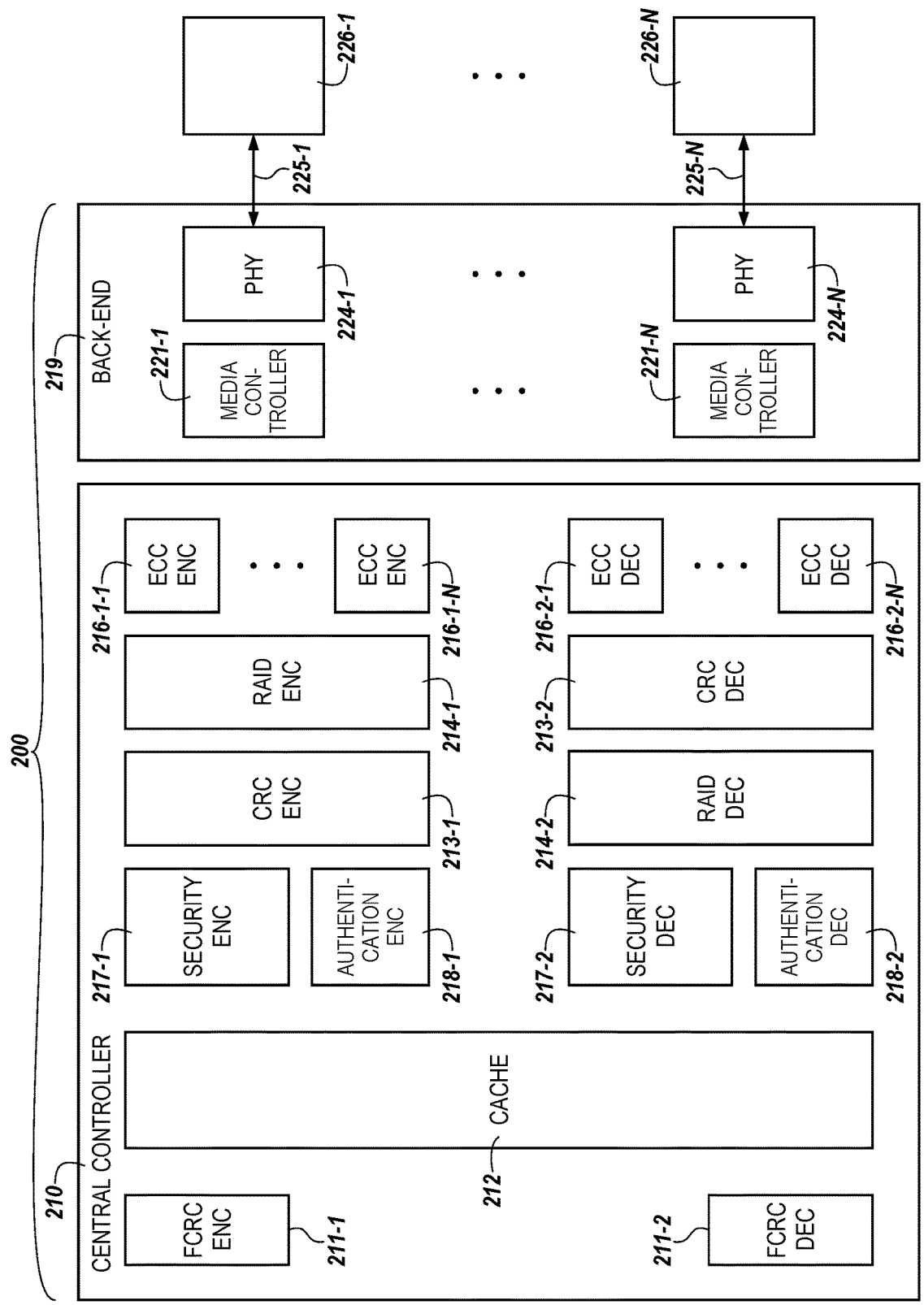
FIG. 2 is a functional block diagram of a memory controller for cache line data protection in accordance with a number of embodiments of the present disclosure.
Figure 3:
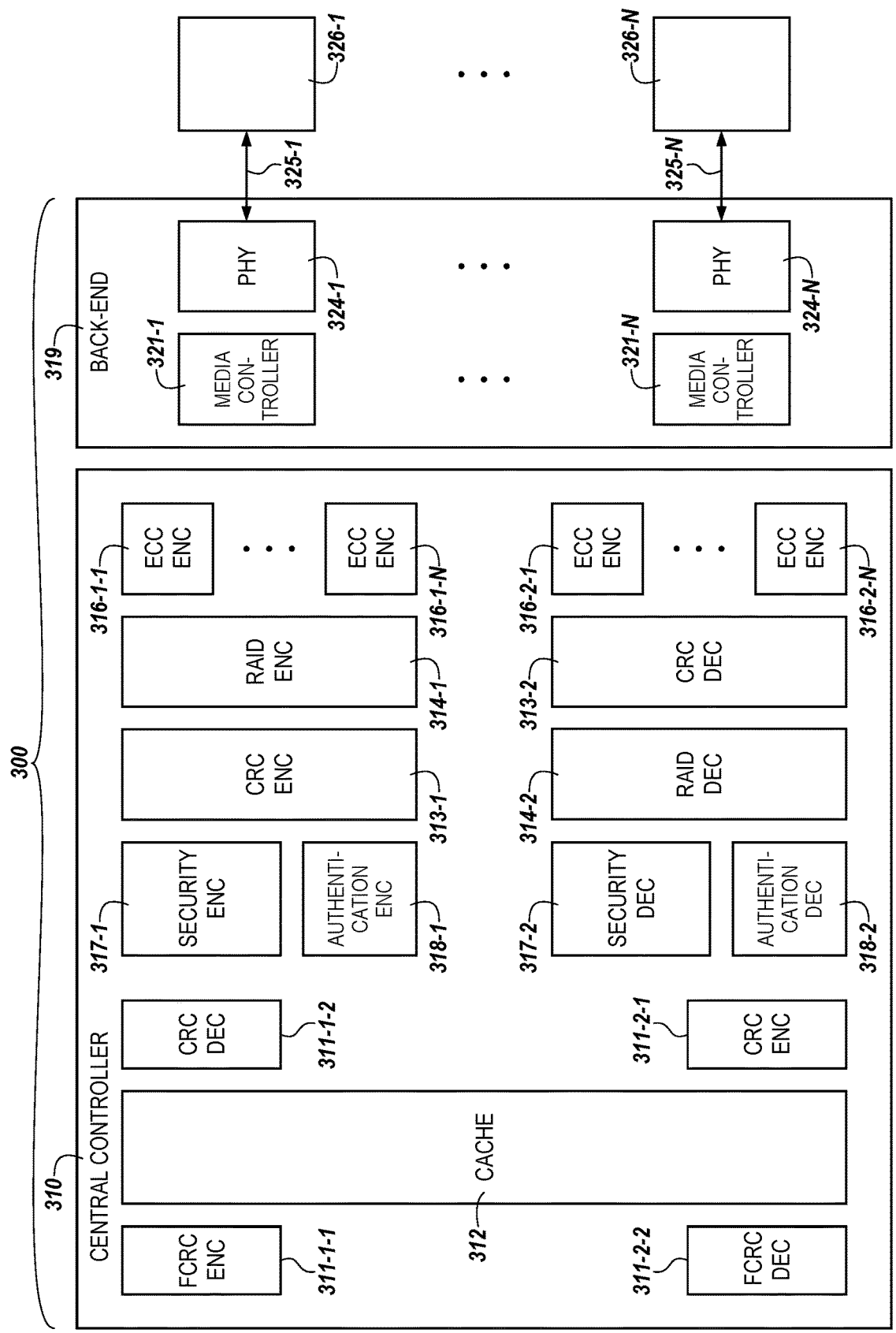
FIG. 3 is another functional block diagram of a memory controller for cache line data protection in accordance with a number of embodiments of the present disclosure.

An error correction operation can be performed to provide error correction capabilities with various granularities. In one example, an error correction operation (e.g., when performed at the ECC decoders 216-2 and/or 316-2 as illustrated in FIGS. 2 and 3, respectively) can provide an error correction capability of correcting a particular quantity of (e.g., bit) errors, while further providing an error detection capability of detecting errors (without correcting those) beyond the particular quantity. While this error correction capability may not be capable of protecting a memory device 126 from its complete failure, another error correction operation, such as a chip kill operation, can provide an error correction capability to restore a memory device 126 despite of its complete failure. The chip kill can involve parity data (e.g., RAID parity or LPCK parity) that are specifically designed for data recovery of the damaged chip. As used herein, error correction information that are generated at the ECC encoders 216-1 and/or used at the ECC decoders 216-2 to perform respective error correction operations at the ECC decoders 216-2 can be referred to as "die-level error correction information", which can be used interchangeably with the term "ECC data". Further, as used herein, error correction information that are used to perform a chip kill operation (e.g., RAID and/or LPCK operation) can be referred to as "multi-level error correction information", which can be used interchangeably with the term "chip kill parity", "RAID parity", and/or "LPCK parity," herein.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include various types data buses, such as a sixteen-pin data bus and a two-pin data mask inversion (DMI) bus, among other possible buses.

As used herein, the term "memory ranks" generally refers to a plurality of memory chips (e.g., memory dice) that can be accessed simultaneously. In some embodiments, each channel 125 may have a sixteen (16)-bit data bus. If there are four 16-bit memory chips (e.g., each including one or more memory dice) connected to the channel 125, each memory chip may correspond to a memory rank. In these embodiments, there may be four (4) memory ranks. In some embodiments, the four memory chips may be eight (8)-bit memory chips (e.g., x8 devices) instead of 16-bit memory chips (e.g., x16 devices). In these embodiments, two memory chips may be combined to form a 16-bit channel and result in the four memory chips forming two memory ranks. Read and write commands may not be executed concurrently in different memory ranks because the read commands and the write commands may use the data channel which is shared in a multi-rank memory topology.

An example of the memory devices 126 is dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 126-1 is operated as an LPDDRx DRAM device with low-power features enabled and at least one of the memory devices 126-N is operated an LPDDRx DRAM device with at least one low-power feature disabled. In some embodiments, although the memory devices 126 are LPDDRx memory devices, the memory devices 126 do not include circuitry configured to provide low-power functionality for the memory devices 126 such as a dynamic voltage frequency scaling core (DVFSC), a sub-threshold current reduce circuit (SCRC), or other low-power functionality providing circuitry. Providing the LPDDRx memory devices 126 without such circuitry can advantageously reduce the cost, size, and/or complexity of the LPDDRx memory devices 126. By way of example, an LPDDRx memory device 126 with reduced low-power functionality providing circuitry can be used for applications other than mobile applications (e.g., if the memory is not intended to be used in a mobile application, some or all low-power functionality may be sacrificed for a reduction in the cost of producing the memory).

Data can be communicated between the back end portion 119 and the memory devices 126 in forms of a data block, such as a user data block (UDB) (e.g., 64 bytes). As used herein, the term "UDB" refers to a data block containing host data (e.g., data received from the host 103 and alternatively referred to as user data).

Along with one or more UDBs, other "extra" bits of data (e.g., in addition to UDBs) can also be transferred between the back end portion 119 and the memory devices 126. The extra data can include data (e.g., error correction information, such as ECC data) dedicated for correcting and/or detecting errors in UDBs and/or data (e.g., error detection information) dedicated for detecting errors in UDBs, although embodiments are not so limited. As described in association with FIGS. 2 and 3 in further details, the error correction and detection information can be generated based collectively on UDBs corresponding to a cache line, as compared to being generated based individually on each UDB.

An UDB can be associated with a parity data block (PDB). As used herein, the term "PDB" refers to a data block containing parity data (e.g., RAID parity in forms of one or more parity symbols) configured for a chip kill (e.g., RAID) operation on one or more UDBs associated with the PDB. A PDB can be generated based on multiple UDBs that can be individually recovered using the PDB and the other UDBs. A PDB and UDBs that share the same PDB can be together referred to as a stripe (e.g., RAID stripe). In some embodiments, some (e.g., one or more) memory devices 126 can be dedicated for PDBs. For example, memory devices configured to store UDBs can be different from a memory device (e.g., one or more memory devices) configured to store PDBs. A data block (e.g., UDB and/or PDB) can be transferred to/from (e.g., written to/read from) the memory devices 126 via the channels 126 over a predefined burst length (e.g., a 32-bit BL) that the memory controller 100 operates with.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

FIG. 2 is a functional block diagram of a memory controller 200 for cache line data protection in accordance with a number of embodiments of the present disclosure. The memory controller 200, the central controller portion 210, the back end portion 219, and the memory devices 226 illustrated in FIG. 2 are analogous to the memory controller 100, the central controller portion 210, the back end portion 119, and the memory devices 126 illustrated in FIG. 1.

The central controller portion 210 includes a front-end CRC ("FCRC") encoder 211-1 (e.g., paired with a FCRC decoder 211-2) to generate error detection information (e.g., alternatively referred to as end-to-end CRC (e2e CRC)) based on data (e.g., an UDB in "plain text" form) received as a part of a write command (e.g., received from the host 103) and before writing the data to the cache 212. As used herein, an UDB in plain text form can be alternatively referred to as an "unencrypted UDB", which can be further interchangeably referred to as a "decrypted UDB" or an "unencrypted version of an UDB".

The error detection information generated at the FCRC encoder 211-1 can be a check value, such as CRC data. Read and write commands of CXL memory systems can be a size of UDB, such as 64 bytes. Accordingly, the data received at the FCRC encoder 211-1 can correspond to an UDB.

The central controller portion 210 includes a cache 212 to store data (e.g., user data), error detection information, error correction information, and/or metadata associated with performance of the memory operation. An example of the cache 212 is a thirty-two (32) way set-associative cache including multiple cache lines. While host read and write commands can be a size of an UDB (e.g., 64 bytes), the cache line size can be greater than a size of an UDB (e.g., equal to a size of multiple UDBs). For example, the cache line size can correspond to a size of 4 UDBs (with each UDB being a 64-byte chunk), such as 256 bytes.

These UDBs stored in each cache line (e.g., alternatively referred to as "UDBs corresponding to a cache line") can be a data transfer unit of data paths between the cache 212 and the memory devices 226. For example, even though a host read/write command is a size of an UDB, such as 64 bytes, the UDBs corresponding to a cache line can be collectively transferred between the cache 212 and the memory devices 226 (e.g., through other encoder/decoder illustrated in FIG. 2) as a chunk. Therefore, the UDBs corresponding to a cache line can be collectively encrypted/decrypted at various encoder/decoders illustrated in FIG. 2 and located between the cache 212 and the memory devices 226. UDBs corresponding to a cache line can be further correspond to a same channel 225. For example, the UDBs corresponding to a cache line can be written to/stored in a same memory device. In some embodiments, at least two UDBs corresponding to a same cache line can further correspond to different RAID stripes as further described in connection with FIGS. 4 and 5.

Data (e.g., UDBs) stored in (e.g., a respective cache line of) the cache 212 can be further transferred to the other components (e.g., a security encoder 217-1 and/or an authenticity/integrity check encoder 218-1, which is shown as "AUTHENTICITY/INTEGRITY ENC" 218-1) of the central controller portion 210 (e.g., as part of cache writing policies, such as cache writeback and/or cache writethrough) to be ultimately stored in the memory devices 226 to synchronizes the cache 212 and the memory devices 226 in the event that the data received from the host (e.g., the host 103 illustrated in FIG. 1) have not been written to the memory devices 226 yet.

Use of the cache 212 to store data associated with a read operation or a write operation can increase a speed and/or efficiency of accessing the data because the cache 212 can prefetch the data and store the data in multiple 64-byte blocks in the case of a cache miss. Instead of searching a separate memory device in the event of a cache miss, the data can be read from the cache 212. Less time and energy may be used accessing the prefetched data than would be used if the memory system has to search for the data before accessing the data.

The central controller portion 210 further includes a security encoder 217-1 (e.g., paired with a security decoder 217-2) to encrypt data (e.g., UDBs corresponding to a cache line) before transferring the data to a CRC encoder 213-1 (to write the data to the memory devices 226). Although embodiments are not so limited, the pair of security encoder/decoder 217 can operate using an AES encryption/decryption (e.g., algorithm). Unencrypted data (e.g., plain text) can be converted to cypher text via encryption by the security encoder 217-1. As used herein, the UDB in cypher text form can be alternatively referred to as an "encrypted UDB", which can be alternatively referred to as an "encrypted version of an UDB". The central controller portion 210 further includes an authenticity/integrity check encoder 218-1 to generate authentication data based on data received from the cache 212. Although embodiments are not so limited, the authentication data generated at the authenticity/integrity check encoder 218-1 can be MAC, such as KECCAK MAC (KMAC) (e.g., SHA-3-256 MAC).

In some embodiments, the MAC generated at the authenticity/integrity check encoder 218-1 can be calculated based on trusted execution environment (TEE) data (alternatively referred to as "TEE flag"), Host Physical Address (HPA) (e.g., a memory address used/identified by the host 103 illustrated in FIG. 1 in association with host read/write transactions), a security key identifier (ID) that are associated with a physical address (of the memory devices 226) to be accessed for executing a host write command.

The security encoder 217-1 and the authenticity/integrity check encoder 218-1 can operate in parallel. For example, the data stored in the cache 212 and that are in plain text form can be input (e.g., transferred) to both the security encoder 217-1 and the authenticity/integrity check encoder 218-1. In some embodiments, a security key ID can be further input (along with the data in plain text form) to the security encoder 217-1. Further, in some embodiments, a security key ID, TEE flag, and an HPA associated with a host write command can be further input (along with the data in plain text form) to the authenticity/integrity check encoder 218-1.

The central controller portion 210 includes a CRC encoder 213-1 (e.g., paired with a CRC decoder 213-2) to generate error detection information (e.g., alternatively referred to as CRC media (CRCm)) based collectively on UDBs corresponding to a cache line received from the security encoder 217-1. The data transferred to the CRC encoder 213-1 from the security encoder 217-1 can be in cypher text form as the data were previously encrypted at the security encoder 217-1. The error detection information generated at the error detection information generator 213-1 can be a check value, such as CRC data. The CRC encoder 213-1 and CRC decoder 213-2 can operate on data having a size equal to or greater than a cache line size.

The central controller portion 210 includes RAID encoder 214-1 (e.g., paired with a RAID decoder 214-2) to generate and/or update RAID parity data (e.g., a PDB) based at least in part on data (e.g., one or more UDBs corresponding to a cache line) received from the CRC encoder 213-1. The data transferred to the RAID encoder 214-1 from the CRC encoder 213-1 can be in cypher text form as the data were encrypted at the security encoder 217-1.

The RAID encoder 214-1 can update the PDB to conform to new UDB received as part of a write command from the host. To update the PDB, an old UDB (that is to be replaced with the new UDB) and an old PDB (of a same stripe as the old UDB) can be read (e.g., transferred to the RAID encoder 214-1) and compared (e.g., XORed) with the new UDB, and a result of the comparison (e.g., the XOR operation) can be further compared (e.g., XORed) with an old PDB (that is to be updated) to result in a new (e.g., updated) PDB.

As shown in FIG. 2, the central controller portion 210 can include ECC encoders 216-1-1, . . . , 216-1-N. Each ECC encoder 216-1 can be configured to generate ECC data (alternatively referred to as "error correction information") based collectively on data (e.g., UDBs corresponding to a cache line) transferred from the RAID encoder 214-1. The data transferred to each ECC encoder 216-1 can be in cypher text form as the data were previously encrypted at the security encoder 217-1.

Each ECC encoder 216-1 can correspond to a respective channel 226/memory device 226. Accordingly, UDBs corresponding to a cache line and transferred to one ECC encoder 216-1-1 (where ECC data are generated based on the UDBs) can be transferred and written to a respective memory device 226 (e.g., the memory device 226-1) along with the ECC data.

Each ECC encoder 216-1 can be paired with a respective one of ECC decoders 216-2-1, . . . , 216-2-N to operate in a collective manner and to be dedicated for each memory device 216. For example, an ECC encoder 216-1-1 that can be responsible for the memory device 226-1 can be paired with an ECC decoder 216-2-1 that is also responsible for the memory device 226-1, which allows ECC data that were generated at the ECC encoder 216-1-1 and are to be later transferred to the ECC decoder 216-2-1 to be stored in the memory device 226-1.

"Extra" bits of data can be transferred (along with the UDBs) to the back end portion 219 to be ultimately transferred and written to the memory devices 226. The "extra" bits can include RAID parity data (e.g., in forms of a PDB) generated at the RAID 214-1, error detection information (e.g., CRC data) generated at the FCRC encoder 211-1 and/or 213-1, error correction information (e.g., alternatively referred to as ECC data) generated at the ECC encoders 216-1, and/or authentication data (e.g., MAC data) generated at the authenticity/integrity check encoder 218-1 that are associated with the UDBs as well as metadata and/or TEE data.

As shown in FIG. 2, the memory controller 200 can include a back end portion 219 coupled to the central controller portion 210. The back end portion 219 can include media controllers 221-1, . . . , 221-N. The back end portion 219 can include PHY memory interfaces 224-1, . . . , 224-N. Each physical interface 224 is configured to be coupled to a respective memory device 226.

The media controllers 221-1, . . . , 221-N can be used substantially contemporaneously to drive the channels 225-1, . . . , 225-N concurrently. In at least one embodiment, each of the media controllers 221 can receive a same command and address and drive the channels 225 substantially contemporaneously. By using the same command and address, each of the media controllers 221 can utilize the channels 225 to perform the same memory operation on the same memory cells.

As used herein, the term "substantially" means that the characteristic need not be absolute, but is close enough so as to achieve the advantages of the characteristic. For example, "substantially contemporaneously" is not limited to operations that are performed absolutely contemporaneously and can include timings that are intended to be contemporaneous but due to manufacturing limitations may not be precisely contemporaneously. For example, due to read/write delays that may be exhibited by various interfaces (e.g., LPDDR5 vs. PCIe), media controllers that are utilized "substantially contemporaneously" may not start or finish at exactly the same time. For example, the memory controllers can be utilized such that they are writing data to the memory devices at the same time regardless of whether one of the media controllers commences or terminates prior to the other.

The PHY memory interfaces 224 can be an LPDDRx memory interface. In some embodiments, each of the PHY memory interfaces 224 can include data and DMI pins. For example, each PHY memory interface 224 can include sixteen data pins and two DMI pins. The media controllers 221 can be configured to exchange data with a respective memory device 226 via the data pins. The media controllers 221 can be configured to exchange error correction information (e.g., ECC data), error detection information, and or metadata via the DMI pins as opposed to exchanging such information via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In at least one embodiment, the data can be exchanged contemporaneously with the error correction information and/or the error detection information. For example, 256 bytes of data (e.g., UDBs corresponding to a cache line) can be exchanged (transmitted or received) via the data pins while 256 bits of the extra bits are exchanged via the DMI pins. Such embodiments reduce what would otherwise be overhead on the data input/output (e.g., also referred to in the art as a "DQ") bus for transferring error correction information, error detection information, and/or metadata.

The back end portion 219 can couple the PHY memory interfaces 224-1, . . . , 224-N to respective memory devices 226-1, . . . , 226-N. The memory devices 226 each include at least one array of memory cells. In some embodiments, the memory devices 226 can be different types of memory. The media controllers 221 can be configured to control at least two different types of memory. For example, the memory device 226-1 can be LPDDRx memory operated according to a first protocol and the memory device 226-N can be LPDDRx memory operated according to a second protocol different from the first protocol. In such an example, the first media controller 221-1 can be configured to control a first subset of the memory devices 226-1 according to the first protocol and the second media controller 221-N can be configured to control a second subset of the memory devices 226-N according to the second protocol.

Data (UDBs corresponding to a cache line) stored in the memory devices 226 can be transferred to the back end portion 219 to be ultimately transferred and written to the cache 212 and/or transferred to the host (e.g., the host 103 illustrated in FIG. 1). In some embodiments, the data are transferred in response to a read command to access a subset of the data (e.g., one UDB) and/or to synchronize the cache 212 and the memory devices 226 to clean up "dirty" data in the cache 212.

Along with the UDBs, other "extra" bits of data can be transferred to the back end portion 219 as well. The "extra" bits can include RAID parity data generated at the RAID encoder 214-1 (e.g., in forms of a PDB), error detection information generated at the FCRC encoder 211-1 and/or 213-1, parity data (e.g., symbols) generated at the RAID encoder 214-1, ECC data generated at the ECC encoders 216-1, and authentication data generated at the authenticity/integrity check encoder 218-1 that are associated with the UDBs as well as metadata and/or TEE data. As described herein, the UDBs transferred to the back end portion 219 can be in cypher text form.

Data (e.g., UDBs corresponding to a cache line) transferred to the back end portion 219 can be further transferred to the respective ECC decoders 216-2. At each ECC decoder 216-2, an error correction operation can be performed on the data to correct error(s) up to a particular quantity and detect errors beyond particular quantity without correcting those. In one example, each ECC decoder 216-2 can use the error correction information (e.g., ECC data) to either correct a single error or detect two errors (without correcting two errors), which is referred to as a single error correction and double error detection (SECDED) operation. In another example, each ECC decoder 216-2 can use the error correction information to either correct a two error or detect three errors (without correcting three errors), which is referred to as a double error correction and triple error detection (DECTED) operation.

As described herein, each ECC decoder 216-2 can also be responsible for a respective memory device 226 as the paired ECC encoder 216-1 is. For example, if the ECC decoder 216-2-1 is responsible for the memory device 226-1, the ECC data and the UDBs stored in the memory device 226-1 can be transferred to the ECC decoder 216-2-1. In some embodiments, pairs of ECC encoder/decoder 216 can be selectively enabled/disabled to transfer data between the memory devices 226 and the memory controller 200 without generating error correction information (e.g., ECC data) and/or performing an error correction operation using the pairs.

Subsequent to error correction operations performed respectively at the ECC decoders 216-2, the UDBs can be further transferred to the CRC decoder 213-2 along with at least the error detection information previously generated at the CRC encoder 213-1. At the CRC decoder 213-2, an error detection operation can be performed to detect any errors in the UDBs using the error detection information, such as CRC data.

The CRC decoder 213-2 can operate on data in conjunction with the RAID decoder 214-2 to provide check-and-recover correction. More specifically, the CRC decoder 213-2 can detect an error in data (e.g., received from the respective ECC decoder 216-2) and the RAID decoder 214-2 can recover the data in response. In at least one embodiment, the check-and-recover correction provided by the error detection circuitry 211 and the RAID decoder 214-2 is supplemental to the error correction provided by the ECC decoder 216-2. For example, if data (e.g., UDBs corresponding to a cache line) transferred from the memory devices 226 has an error correctable by the ECC decoder 216-2, it can do so without further data recovery (e.g., one or more RAID operations) by the RAID decoder 214-2. However, if an error persists that is not correctable by the ECC decoder 216-2, then the data may be recoverable by the RAID decoder 214-2. As another example, an error may escape detection by the ECC decoder 216-2, but be detected by the CRC decoder 213-2. In such an example, the underlying data may be recoverable by the RAID decoder 214-2.

Figure 6:
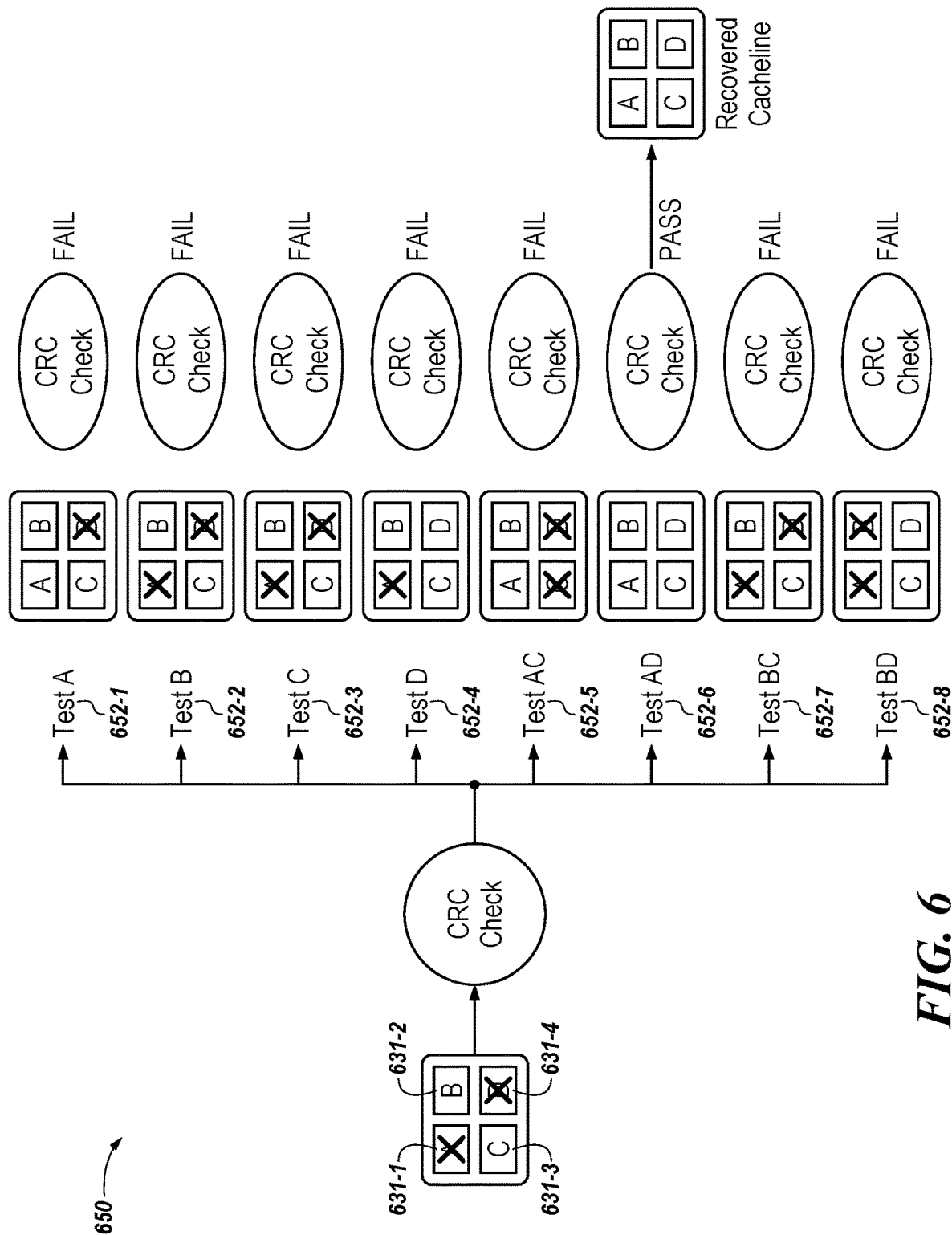
FIG. 6 is a block diagram schematically illustrating a RAID process for cache line data protection in accordance with a number of embodiments of the present disclosure.

When the RAID process is triggered by the RAID decoder 214-2, the other UDBs and PDBs belong to same stripes of the UDBs (that were checked for errors at the respective CRC decoder 213-2) can be transferred to the RAID decoder 214-2 where one or more RAID operations are performed. In some embodiments, the RAID decoder 214-2 can further include a CRC decoder that provides the same functionality as the CRC decoder 213-2, but to perform an error detection operation (e.g., to CRC-check) on data subsequent to the RAID process. RAID operations performable at the RAID decoder 214-2 are illustrated in FIG. 6 in further details.

The data (e.g., UDBs corresponding to a cache line) can be further transferred to the security decoder 217-2 and to the authenticity/integrity check decoder 218-2 (shown as "AUTHENTICITY/INTEGRITY DEC" 218-2 in FIG. 2) along with at least the authentication data previously generated at the authenticity/integrity check encoder 218-1. At the security decoder 217-2, the data can be decrypted (e.g., converted from the cypher text back to the plain text as originally received from the host). The security decoder 217-2 can use an AES decryption to decrypt the data.

At the authenticity/integrity check decoder 218-2, the data that were decrypted at the security decoder 217-2 can be authenticated (and/or checked for data integrity) using the authentication data (e.g., MAC data) that were previously generated at the authenticity/integrity check encoder 218-1. In some embodiments, the authenticity/integrity check decoder 218-2 can calculate MAC based on TEE data, HPA, and the security key ID associated with a physical address to be accessed for executing a host read command. The MAC that is calculated during the read operation can be compared to the MAC transferred from (a location corresponding to the physical address of) the memory devices 226. If the calculated MAC and transferred MAC match, the UDB is written to the cache 212 (and further transferred to the host if needed). If the calculated MAC and transferred MAC do not match, the host is notified of the mismatch (and/or the poison).

The data (e.g., UDBs corresponding to a cache line) authenticated (and/or checked for data integrity) at the authenticity/integrity check decoder 218-2 can be transferred and written to the cache 212. In some embodiments, data can be further transferred from the cache 212 to the FCRC decoder 211-2, for example, in response to a read command received from the host (e.g., the host 103 illustrated in FIG. 1). As described herein, host read and write commands of CXL memory systems can be a size of UDB, such as 64 bytes. For example, data can be requested by the host in a granularity of an UDB. In this example, even if data transferred from the memory devices 226 are multiple UDBs (corresponding to a cache line), data can be transferred from the cache 212 to the host in a granularity of an UDB. At the FCRC decoder 211-2, data (e.g., an UDB requested by the host) can be checked (CRC-checked) for any errors using CRC data that were previously generated at the FCRC encoder 211-1. The data decrypted at the FCRC decoder 211-2 can be further transferred to the host.

FIG. 3 is another functional block diagram of a memory controller 300 for cache line data protection in accordance with a number of embodiments of the present disclosure. The memory controller 300, the central controller portion 310, the back end portion 319, and the memory devices 326 illustrated in FIG. 3 are analogous to the memory controller 100, the central controller portion 110, the back end portion 119, and the memory devices 126 illustrated in FIG. 1.

The memory controller 300 can include a central controller portion 310, and a back end portion 319. The central controller portion 310 can include a front-end CRC ("FCRC") encoder 311-1-1 paired with a FCRC decoder 311-2 and a FCRC encoder 311-2-1 paired with a FCRC decoder 311-2-1, the cache memory 312 coupled between the paired CRC encoder/decoder 311-1 and CRC encoder/decoder 311-2, the security encoder 317-1 paired with the security decoder 317-2, the authenticity/integrity check encoder 318-1 (shown as "AUTHENTICITY/INTEGRITY ENC" 318-1 in FIG. 3) paired with the authenticity/integrity check decoder 318-2 (shown as "AUTHENTICITY/INTEGRITY DEC" 318-2 in FIG. 3), the CRC encoder 313-1 paired with the CRC decoder 313-2, the RAID encoder 314-1 paired with the RAID decoder 314-2, and the ECC encoders 316-1-1, . . . , 316-1-N respectively paired with the ECC decoders 316-2-1, . . . , 316-2-N. A pair of security encoder/decoder 317, a pair of authenticity/integrity check encoder/decoder 318, a pair of CRC encoder/decoder 313, a pair of RAID 314, respective pairs of ECC encoder/decoder 316 can be analogous to a pair of security encoder/decoder 217, a pair of authenticity/integrity check encoder/decoder 218, a pair of CRC encoder/decoder 213, a pair of RAID 214, respective pairs of ECC encoder/decoder 216, as illustrated in FIG. 2. Although not illustrated in FIG. 3, the RAID decoder 214-2 can further include a CRC decoder that provides the same functionality as the CRC decoder 313-2, but to perform an error detection operation (e.g., to CRC-check) on data subsequent to the RAID process.

The back end portion 319 can include media controllers 321-1, . . . , 321-N. The PHY layer 322 can include PHY memory interfaces 324-1, . . . , 324-N configured to be coupled to memory devices 326-1, . . . , 326-N via channels 325-1, . . . , 325-N.

FIG. 3 is analogous to FIG. 2, except that it includes additional circuitry to check any errors on the UDB using CRC data without transferring/storing the CRC data to the memory device 326. For example, as illustrated in FIG. 3, the FCRC decoder 311-1-2 coupled between the cache 312 and the security encoder 317-1 (and/or the authenticity/integrity check encoder 318-1) can be configured to check any errors on an UDB stored in the cache 212 using error detection information (e.g., CRC data) generated at the FCRC encoder 311-1-1. The FCRC encoder 311-2-1 coupled between the cache 312 and the security decoder 317-2 (and/or the authenticity/integrity check decoder 318-2) can be configured generate error detection information (e.g., CRC data) on an UDB to be transferred to the host (e.g., the host 103 illustrated in FIG. 1). The error detection information generated at the FCRC encoder 311-2-1 can be used at the FCRC decoder 311-2-2 to check any errors on an UDB transferred from the cache 312.

In some embodiments, the pairs of CRC encoder/decoder 311-1 and 311-2 can be used just to check errors on data stored in the cache. Accordingly, error detection information used at the pairs 311-1 and 311-2 may not be transferred and written to the memory devices 336.

Figure 4:
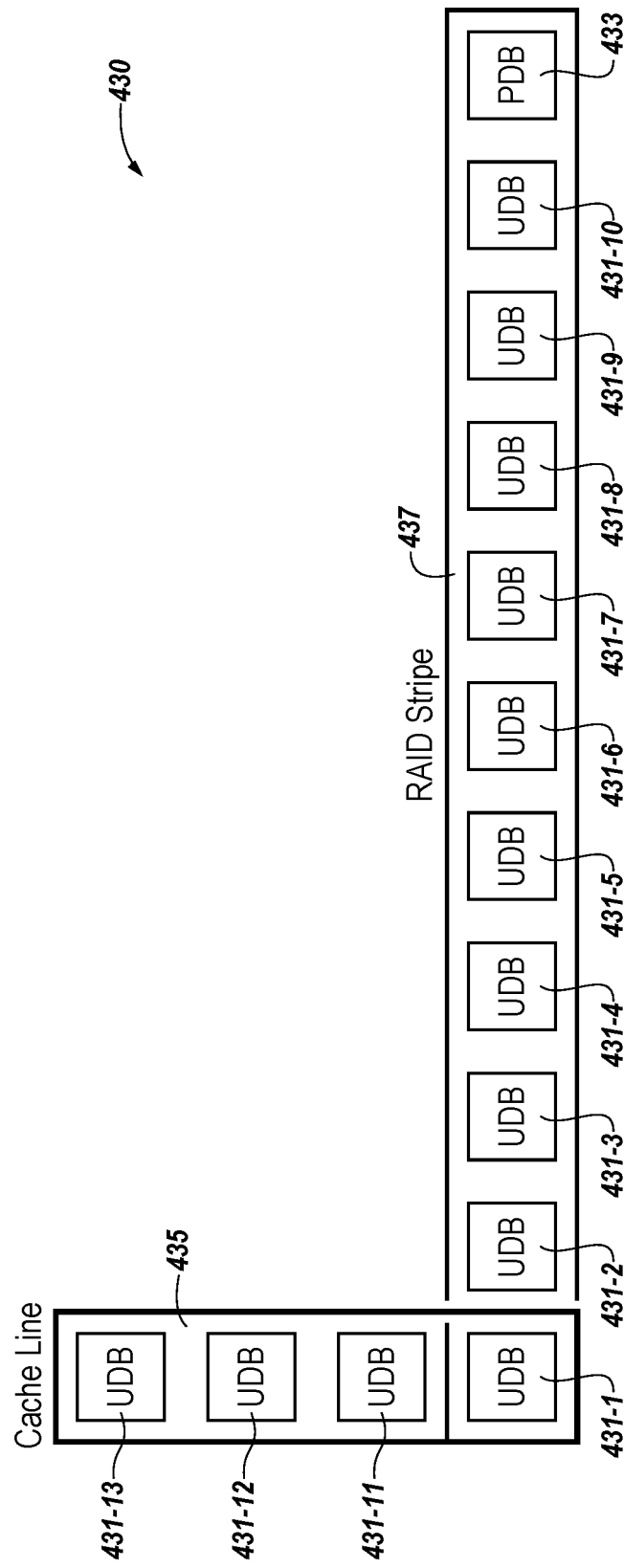
FIG. 4 is a block diagram schematically illustrating a redundant array of independent disks (RAID) stripe and data corresponding to a cache line in accordance with a number of embodiments of the present disclosure.

FIG. 4 is a block diagram 430 schematically illustrating a RAID stripe 437 and data (e.g., a group of UDBs 435) corresponding to a cache line in accordance with a number of embodiments of the present disclosure. As illustrated in FIG. 4, the RAID stripe 437 (alternatively referred to as just "stripe") includes UDBs 431-1, . . . , 431-10 and a PDB 433. The PDB 433 includes RAID parity data that was generated (e.g., at the RAID encoder 214-1 and/or 314-1 illustrated in FIGS. 2 and 3, respectively) using the UDBs 431-1, . . . , 431-10. Although embodiments are not so limited, each UDB 431 of the RAID stripe 437 can respectively correspond to different channels (e.g., the channels 125 and/or 225 illustrated in FIGS. 1 and 2, respectively) such that the UDBs 431 of the RAID stripe 437 are stored in/written to different memory devices (e.g., the memory devices 126 and/or 226 illustrated in FIGS. 1 and 2, respectively).

A group of UDBs 435 including UDBs 431-1, 431-11, 431-12, 431-13 can correspond to a cache line and be a data transfer unit between the cache (e.g., cache 212 and/or 312 illustrated in FIGS. 2 and 3) and memory device (e.g., the memory devices 126 and/or 226 illustrated in FIGS. 1 and 2). Further, when transferred/written to the cache 212, the group of UDBs 435 can be included in a same cache line.

The UDBs 431 of the group 435 can further correspond to different RAID stripes. For example, the UDBs 431-11, 431-12, and 431-13 can respectively correspond to RAID stripes different than the RAID stripe 437 such that the UDBs 431 of the group 435 can correspond to four different RAID stripes. Although embodiments are not so limited, the group of UDBs 435 can further correspond to one channel (e.g., the channel 125 and/or 225 illustrated in FIGS. 1 and 2, respectively) such that the UDBs 431-1, 431-11, 431-12, and 431-13 are stored in/written to the same memory devices (e.g., the memory device 126 and/or 226 illustrated in FIGS. 1 and 2, respectively).

As described herein, error correction information (e.g., ECC data generated at a respective ECC encoder 216-1 and/or 316-1 illustrated in FIGS. 2 and 3, respectively) and/or error detection information (e.g., CRC data generated at a respective CRC encoder 213-1 and/or 313-1 illustrated in FIGS. 2 and 3, respectively) can be generated on a cache line basis (e.g., based collectively on UDBs corresponding to a cache line). For example, rather than generating the error correction information and/or error detection information based individually on each UDB 431, the UDBs 431-1, 431-11, 431-12, and 431-13 can be collectively used to generate the error correction information and/or error detection information.

The group of UDBs 435 can be collectively input (e.g., transferred) to the CRC decoder (e.g., the CRC decoder 213-2 and/or 313-2 illustrated in FIG. 2) where the group of UDBs 435 can be collectively checked (CRC checked) for one or more errors. If it is determined that the group of UDBs 435 indeed includes the errors, a RAID process is triggered and RAID operations are performed for each RAID stripe. For example, a RAID operation can be performed on the RAID stripe 437 by further transferring the UDBs 431-2, . . . , 431-10 and the PDB 433 (that have not been transferred to the RAID decoder 214-2 and/or 314-2 illustrated in FIGS. 2 and 3, respectively) from the memory devices. Other (e.g., three) RAID operations can be performed on RAID stripes respectively including the UDBs 431-11, 431-12, and 431-13 in a same manner as the RAID operation performed on the RAID stripe 437.

In some embodiments, the RAID operations can be performed on the RAID stripes (e.g., respectively including the UDBs 431-1, 431-11, 431-12, and 431-13) regardless of (independently of) which one of the UDBs 431-1, 431-11, 431-12, and 431-13 includes one or more (e.g., bit) errors. Stated alternatively, the RAID process, when triggered, ensures that all four RAID operations are performed respectively on the UDBs 431-1, 431-11, 431-12, and 431-13.

In some embodiments, the RAID operations may not be performed on one or more of the RAID stripes (e.g., respectively including the UDBs 431-1, 431-11, 431-12, and 431-13) depending on indication provided by the CRC 213-2 decoder. For example, subsequent to a first RAID operation performed (e.g., on the RAID stripe 437), the group of UDBs 435 can be further checked for one or more errors (at a CRC decoder within the RAID decoder 214-2 and/or 314-2 illustrated in FIGS. 2 and 3, respectively) using the CRC data (previously generated at the CRC encoder 213-1 and/or 313-1 illustrated in FIGS. 2 and 3, respectively). If it is determined that the group of UDBs 435 still includes one or more errors, a subsequent RAID operation can be performed on a different RAID stripe (e.g., the RAID stripe including the UDB 431-11). Otherwise (e.g., if it is determined that the group of UDBs 435 no longer includes the errors), the group of UDBs 435 can be transferred to the security decoder 417-2 without the subsequent RAID operation.

Figure 5:
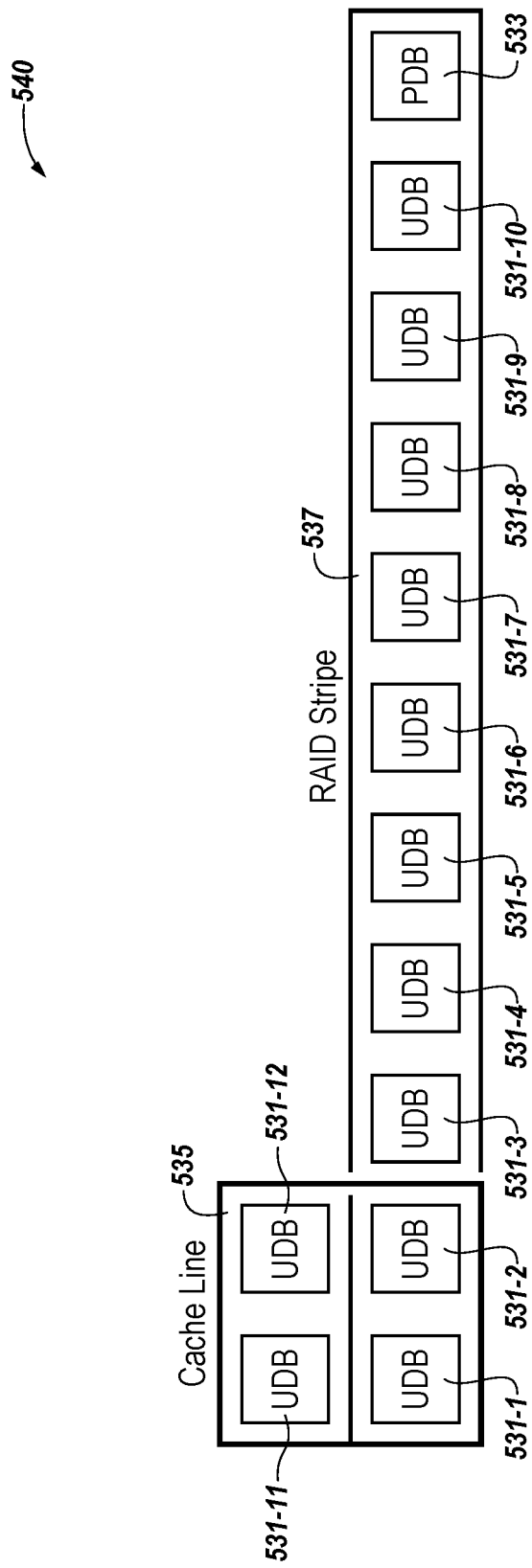
FIG. 5 is another block diagram schematically illustrating a RAID stripe and data corresponding to a cache line in accordance with a number of embodiments of the present disclosure.

FIG. 5 is another block diagram schematically illustrating a RAID stripe and data (e.g., a group of UDBs 535) corresponding to a cache line in accordance with a number of embodiments of the present disclosure. As illustrated in FIG. 4, the RAID stripe 537 (alternatively referred to as just "stripe") includes UDBs 531-1, . . . , 531-10 and a PDB 533. The PDB includes RAID parity data that was generated (e.g., at the RAID circuitry 214) using the UDBs 531-1, . . , 531-10. Although embodiments are not so limited, each UDB 531 of the RAID stripe 537 can respectively correspond to different channels (e.g., the channels 125 and/or 225 illustrated in FIGS. 1 and 2, respectively) such that the UDBs 531 of the RAID stripe 537 are stored in/written to different memory devices (e.g., the memory devices 126 and/or 226 illustrated in FIGS. 1 and 2, respectively).

A group of UDBs 535 including UDBs 531-1, 531-2, 531-11, 531-11 can correspond to (e.g., be stored in) a cache line and can be a data transfer unit between the cache (e.g., cache 212 and/or 412 illustrated in FIGS. 2 and 3) and memory device (e.g., the memory devices 126 and/or 226 illustrated in FIGS. 1 and 2).

Unlike the group 435 illustrated in FIG. 4, some UDBs of the group 535 can correspond to a same RAID stripe. For example, the UDBs 531-1 and 531-2 can correspond to the RAID stripe 537 and the UDBs 531-11 and 531-12 can correspond to another (e.g., same) RAID stripe (not shown in FIG. 5).

Although embodiments are not so limited, the UDBs 531-1 and 531-11 can correspond to one channel (e.g., the channel 125 and/or 225 illustrated in FIGS. 1 and 2, respectively), while the UDBs 531-2 and 531-12 correspond to another channel. Accordingly, the UDBs 531-1 and 531-11 can be stored in/written to one (e.g., same) memory device (e.g., the memory device 126 and/or 226 illustrated in FIGS. 1 and 2, respectively), while the UDBs 531-2 and 531-12 are stored in/written to another (e.g., same) memory device.

The group of UDBs 535 can be collectively input (e.g., transferred) to the CRC decoder (e.g., the CRC decoder 213-2 illustrated in FIG. 2) where the group of UDBs 535 can be collectively checked (CRC-checked) for one or more errors. If it is determined that the group of UDBs 535 indeed includes the errors, a RAID process is triggered and RAID operations are performed for each RAID stripe with different combinations of UDBs of the group 535. For example, one or more RAID operations (up to 8 RAID operations) can be performed individually on the UDB 531-1, 531-2, 531-11, and 531-12 as well as collectively on a combination of the UDBs 531-1 and 531-11, a combination of the UDBs 531-1 and 531-12, a combination of the UDBs 531-2 and 531-11, and a combination of the UDBs 531-2 and 531-12.

As described further in connection with FIG. 6, a RAID operation performed to recover a first UDB (that indeed has no errors) based at least on a second UDB including one or more errors can undesirably result in the first UDB with errors. Accordingly, in some embodiments, a CRC check (e.g., alternatively referred to as an error detection operation) can be performed in various manners to ensure that the RAID operation is performed on one UDB that needs to be recovered.

FIG. 6 is a block diagram 650 schematically illustrating a RAID process for cache line data protection in accordance with a number of embodiments of the present disclosure. UDBs 631-1 (UDB "A" shown in FIG. 6), 631-2 (UDB "B" shown in FIG. 6), 631-3 (UDB "C" shown in FIG. 6), and 631-4 (UDB "D" shown in FIG. 6) illustrated in FIG. 6 can correspond to a cache line with the UDBs 631-1 and 631-2 corresponding to one RAID stripe and the UDBs 631-3 and 631-4 corresponding to another RAID stripe (e.g., in a similar manner as the group of UDBs 535 illustrated in FIG. 5).

FIG. 6 illustrates an example scenario, in which the UDB "A" and the UDB "D" includes one or more errors that were not correctable at the respective ECC decoder (e.g., the ECC decoder 216-2 and/or 316-2 illustrated in FIGS. 2 and 3, respectively) and caused a failure at a CRC check (e.g., alternatively referred to as an error detection operation) performed at the CRC decoder (e.g., the CRC decoder 213-2 and/or 313-2 illustrated in FIGS. 2 and 3, respectively). At the RAID decoder 214-2, one or more RAID operations are performed (e.g., in serial or in parallel) on eight different combinations/scenarios.

For example, a RAID operation 652-1 is performed based on postulation that only UDB "A" includes one or more errors; a RAID operation 652-2 is performed based on postulation that only UDB "B" includes one or more errors; a RAID operation 652-3 is performed based on postulation that only UDB "C" includes one or more errors; and a RAID operation 652-4 is performed based on postulation that only UDB "D" includes one or more errors. The RAID operation 652-1 correctly recovers the UDB "A", while misses to recover the UDB "D". The RAID operations 652-2 and 652-3 miss to recover both the UDBs "A" and "D". The RAID operation 652-1 correctly recovers the UDB "D", while misses to recover the UDB "A".

Further, a RAID operation 652-5 is performed based on postulation that UDBs "A" and "C" include one or more errors; a RAID operation 652-6 is performed based on postulation that UDBs "A" and "D" include one or more errors; a RAID operation 652-7 is performed based on postulation that UDBs "B" and "C" include one or more errors; AND a RAID operation 652-8 is performed based on postulation that UDBs "B" and "D" include one or more errors. The RAID operation 652-5 correctly recovers UDB "A", while incorrectly recovers UDB "C" because the UDB "C" is recovered using the UDB "D" having the errors. The RAID operation 652-6 correctly recovers UDBs "A" and "D". The RAID operation 652-7 misses to recover both UDBs "A" and "D". The RAID operation 652-8 correctly recovers UDB "D", while incorrectly recovers UDB "B" because the UDB "B" is recovered using the UDB "A" having the errors. Accordingly, out of the RAID operations 652 performed on different combinations corresponding to various postulations, the RAID operation 652-6 is the one that corrects/recovers the UDBs 631 properly.

The RAID operations 652 can be performed in various manners in conjunction with one or more CRC checks. In one example, the RAID operations 652 are performed sequentially with a respective CRC check performed subsequent to each RAID operation. For example, the RAID operations 652 can be performed in a sequence of 652-1 to 652-6 with six CRC checks performed subsequent to each RAID operations 652-1, 652-2, 652-3, 652-4, 652-5, and 652-6. Since the CRC check performed subsequent to the RAID operation 652-6 will say "pass" (e.g., no errors in the UDBs 631-1, . . . , 631-4), the RAID process is completed and the RAID operations 652-7 and 652-8 need not be performed. In another example, the RAID operations 652 are performed in parallel on (e.g., copies of) the UDBs 631-1, . . . , 631-4. In this example, the CRC checks are performed respectively for the RAID operations 652 and the copy of the UDBs 631 (e.g., associated with the RAID operation 652-6) with "pass" will be further transferred to the security decoder (e.g., the security decoder 217-2 and/or 317-2 illustrated in FIGS. 2 and 3, respectively).

In a non-limiting example, an apparatus (e.g., the computing device 101 illustrated in FIG. 1) can include a number of memory devices (e.g., the memory devices 126, 226, and/or 326 illustrated in FIGS. 1, 2, and 3, respectively) and a memory controller (e.g., the memory controller 100, 200, and/or 300 illustrated in FIGS. 1, 2, and 3, respectively) coupled to the number of memory devices. The memory controller can be configured to receive a plurality of user data blocks (UDBs) (e.g., the UDBs 431, 531, 631, and/or 731 illustrated in FIGS. 4, 5, 6, and 7, respectively) corresponding to a cache line. The plurality of UDBs can belong to respective different stripes. The memory controller can be further configured to generate error detection information based collectively on the plurality of UDBs corresponding to the cache line. The memory controller can be further configured to generate error correction information (e.g., ECC data generated at the respective ECC encoder 216-1 and/or 316-1) based collectively on the plurality of UDBs corresponding to the cache line. The memory controller can be further configured to write, along with the error detection information and error correction information, the plurality of UDBs to the number of memory devices.

Figure 7A:
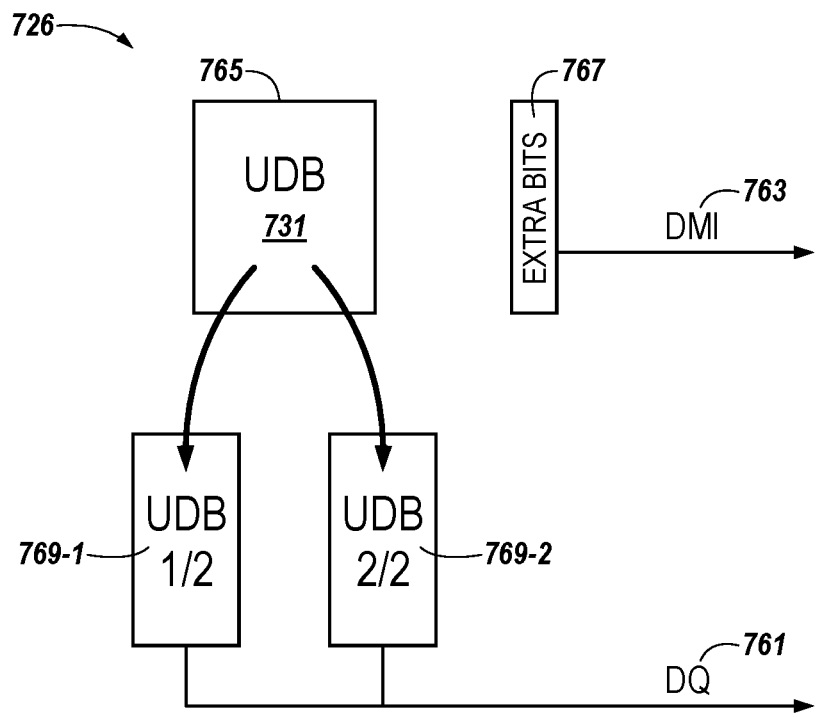
FIG. 7A is a block diagram of a memory device configured for user data blocks (UDBs) corresponding to a cache line in accordance with a number of embodiments of the present disclosure.
Figure 7B:
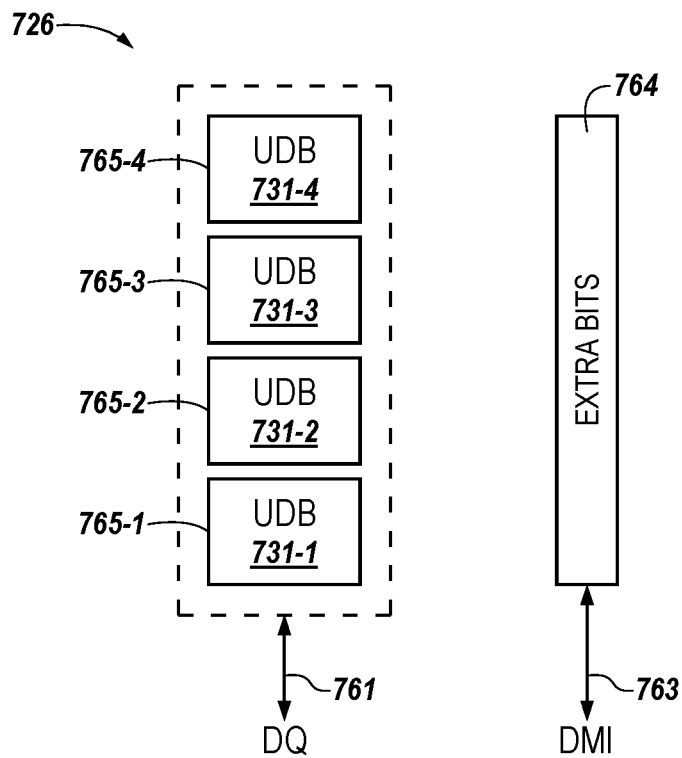
FIG. 7B is a block diagram of a memory device configured for UDBs corresponding to a cache line in accordance with a number of embodiments of the present disclosure.

In some embodiments, the memory controller can be further configured to write each of the plurality of UDBs to a first portion (e.g., the portion 765 of the memory device 726 illustrated in FIGS. 7A and 7B) of a respective memory device of the number of memory devices. The first portion of each of the number of memory devices can include a number of data pins. In this example, the memory controller can be further configured to write the error detection information and the error correction information to one or more second portions (e.g., the portion 767 and/or 764 of the memory device 726 illustrated in FIGS. 7A and 7B, respectively) of the respective memory devices of the number of memory devices. The second portion of each of the number of memory devices can include a number of data mask inversion (DMI) pins.

In some embodiments, the number of memory devices can be coupled to the memory controller via a number of channels (e.g., the channels 125, 225 and/or 335 illustrated in FIGS. 1, 2, and 3, respectively). In this example, the memory controller can be configured to write the plurality of UDBs to one or more memory devices coupled to a same channel of the number of channels.

In some embodiments, each stripe can be a unit of redundant array of independent disks (RAID) access. In some embodiments, the plurality of UDBs can be received as part of different write commands.

In some embodiments, the plurality of UDBs corresponding to a cache line can include at least two UDBs from each of the stripes. In some embodiments, the error detection information can correspond to cyclic redundancy check (CRC) data.

In another non-limiting example, an apparatus (e.g., the computing device 101 illustrated in FIG. 1) can include a number of memory devices (e.g., the memory devices 126, 226, and/or 326 illustrated in FIGS. 1, 2, and 3, respectively) and a memory controller (e.g., the memory controller 100, 200, and/or 300 illustrated in FIGS. 1, 2, and 3, respectively) coupled to the number of memory devices. The memory controller can be configured to receive, from the number of memory devices, a plurality of user data blocks (UDBs) (e.g., the UDBs 431, 531, 631, and/or 731 illustrated in FIGS. 4, 5, 6, and 7, respectively) corresponding to a cache line. The plurality of UDBs can belong to respective different stripes. The memory controller can be further configured to perform, to correct a quantity of bit errors within the plurality of UDBs, a first error correction operation collectively on the plurality of UDBs using error correction information (e.g., ECC data generated at the respective ECC encoder 216-1 and/or 316-1) generated based collectively on the plurality of UDBs. The memory controller can be further configured to perform, to determine whether to perform one or more second error correction operations (e.g., one or more RAID operations 652 illustrated in FIG. 6) on the plurality of UDBs, a first error detection operation collectively on the plurality of UDBs using error detection information generated based collectively on the plurality of UDBs.

In some embodiments, the memory controller can be configured to perform one or more second error detection operations subsequent to a respective one of the one or more second error correction operations. In some embodiments, the memory controller can be configured to transfer the plurality of UDBs to a cache (e.g., the cache 212 and/or 312 illustrated in FIGS. 2 and 3, respectively) responsive to the second error detection operation indicating the plurality of UDBs not having an amount of bit errors. Further, the memory controller can be configured to perform a subsequent error detection operation of the one or more second error detection operations on the plurality of UDBs responsive to the second error detection operation indicating the plurality of UDBs having an amount of bit errors.

In some embodiments, the memory controller can be configured to cause the number of memory devices to transfer the plurality of UDBs to the memory controller via a number of data pins and transfer, contemporaneously with the transfer of the plurality of UDBs, the error correction information or the error detection information to the memory controller via a number of data mask inversion (DMI) pins.

In some embodiments, the memory controller can be configured to perform, to recover one or more UDBs of the plurality of UDBs, the one or more second error correction operations responsive to the first error detection operation indicating an amount of bit errors in the plurality of UDBs. In this example, at least one of the one or more second error correction operations can correspond to a redundant array of independent disks (RAID) operation.

Continuing with this example, the plurality of UDBs corresponding to a cache line can include at least two UDBs (e.g., two UDBs 531-1 and 531-2 and/or two UDBs 531-11 and 531-12 illustrated in FIG. 5) from each of the stripes. In this example, the controller can be configured to perform a respective one of a number of second error correction operations individually on each user block of the number of user blocks. Further, the controller can be configured to perform a respective one of a number of second error correction operations collectively on each subset of the plurality of UDBs. Each subset can include one UDBs from each stripe.

FIG. 7A is a block diagram of a memory device 726 configured for user data blocks (UDBs) corresponding to a cache line in accordance with a number of embodiments of the present disclosure. The memory device 726 can be analogous to the memory device 126, 226, and/or 326 illustrated in FIGS. 1-3, respectively. The memory device 726 is not illustrated in its entirety in FIG. 7A and can further include other portions that are not illustrated in FIG. 7A. For example, the memory device 726 can further include the other portions that are configured to store, for example, other UDBs.

The memory device 726 can be configured to store one or more UDBs, such as an UDB 731 in a portion 765 of the memory device 726. The UDB 731 can be stored over multiple memory dice of the memory device 726, such as two memory dice, although embodiments are not so limited. For example, one memory die can include a sub-portion 769-1 of the memory device 726 and a first half of the portion 767 (of the memory device 726), while another memory die can include a sub-portion 769-2 of the memory device 726 and a second half of the portion 767 (of the memory device 726).

Extra data (e.g., bits) can be stored in a portion 767 of the memory device 726. Examples of the extra data can be ECC (e.g., generated at one or more ECC encoders 216-1 and/or 316-1 illustrated in FIGS. 2 and 3, respectively), CRC (e.g., CRCm generated at the CRC encoder 213-1 and/or 313-1 illustrated in FIGS. 2 and 3, respectively, and/or e2e CRC generated at the FCRC encoder 211-1 illustrated in FIG. 2), metadata, TEE, and/or MAC data (e.g., generated at the authenticity/integrity check encoder 218-1 and/or 318-1 illustrated in FIGS. 2 and 3, respectively).

Data paths 761 and 763 can be part of a channel coupled to the memory device 726, such as the channel 125, 225, and/or 325 illustrated in FIGS. 1-3, respectively. The data path 761 ("DQ" as shown in FIG. 7A) can be provided for transferring the UDB 731 to/from the portion 765 (e.g., sub-portions 769-1 and 769-2) of the memory device 726 and a data path 763 ("DMI" as shown in FIG. 7A) can be provided for transferring extra bits to/from the portion 767 of the memory device 726. The data path 761 can include DQ pins and the data path 763 can include one or more DMI pins. For example, the data path 761 can include sixteen DQ pins (e.g., eight DQ pins for each memory die) and data path 763 can include two DMI pins (e.g., one (1) DMI pin for each memory die), which can cause 16-bit data transfer at a time via the data path 761 and 2-bit data transfer at a time via the data path 763.

FIG. 7B is a block diagram of a memory device 726 configured for user data blocks (UDBs) corresponding to a cache line in accordance with a number of embodiments of the present disclosure. The memory device 726 can be analogous to the memory device 126, 226, and/or 326 illustrated in FIGS. 1-3, respectively.

As illustrated in FIG. 7B, the memory device 726 is configured for storing UDBs, such as UDBs 731-1, 731-2, 731-3, and 731-4 respectively in portions 765-1, 765-2, 765-3, and 765-4 of the memory device 726. Each portion 765 illustrated in FIG. 7B can be analogous to the portion 765 illustrated in FIG. 7A. For example, each portion 765 illustrated in FIG. 7B can be a part of two memory dice (each including a respective sub-portion of the portion 764) where each UDB 731 is stored over. The UDBs 731 can be analogous to the group of user data blocks 435, 535, and 635 illustrated in FIGS. 4-6, respectively. For example, the UDBs 731-1, 731-2, 731-3, and 731-4 can correspond to a cache line and at least two of the UDBs 731-1, 731-2, 731-3, and 731-4 can belong to different RAID stripes.

Further, the memory device 726 is configured for storing extra data (e.g., bits) in a portion 764 of the memory device 726. Examples of the extra data can be ECC (e.g., generated at one or more ECC encoders 216-1 and/or 316-1 illustrated in FIGS. 2 and 3, respectively), CRC (e.g., CRCm generated at the CRC encoder 213-1 and/or 313-1 illustrated in FIGS. 2 and 3, respectively, and/or e2e CRC generated at the FCRC encoder 211-1 illustrated in FIG. 2), metadata, TEE, and/or MAC data (e.g., generated at the authenticity/integrity check encoder 218-1 and/or 318-1 illustrated in FIGS. 2 and 3, respectively).

Data paths 761 and 763 can be part of a channel coupled to the memory device 726, such as the channel 125, 225, and/or 325 illustrated in FIGS. 1-3, respectively. The data path 761 ("DQ" as shown in FIG. 7B) can be provided for transferring UDBs 731-1, . . . , 731-4 to/from the portion 765 of the memory device 726 and a data path 763 ("DMI" as shown in FIG. 7A) can be provided for transferring extra bits to/from the portion 764 of the memory device 726. The data path 761 can include DQ pins and the data path 763 can include one or more DMI pins. For example, the data path 761 can include sixteen DQ pins (e.g., eight DQ pins for each memory die) and data path 763 can include two DMI pins (e.g., one (1) DMI pin for each memory die), which can cause 16-bit data transfer at a time via the data path 761 and 2-bit data transfer at a time via the data path 763.

Each UDB 731 can correspond to a respective memory chip and a different memory rank. In this example, the UDBs 731 stored in the memory device 726 can be sequentially transferred via the data path 761. For example, the UDB 731-1 can be transferred via a first 32-bit BL, the UDB 731-1 can be transferred via a second 32-bit BL, the UDB 731-1 can be transferred via a third 32-bit BL, and the UDB 731-1 can be transferred via a fourth 32-bit BL.

The ECC and CRC data stored and/or to be stored in the portion 764 can be generated based collectively on the UDBs 731 stored and/or to be stored in the portions 765, which results in a fewer number of bits as compared to generating the ECC and CRC (that provides protection over the UDBs 731) based individually on each one of the UDBs 731.

TABLE 1

| ECC per CL | | | | | |
|---|---|---|---|---|---|
| ECC | CRCm | e2e CRC | MD | TEE | MAC |
| Die |  |  |  |  |  |
| UDB |  |  | 16 | 3 |  | 28 |
| CL | 27 | 40 | 64 | 12 | 1 | 112 |

TABLE 2

| ECC per UDB | | | | | |
|---|---|---|---|---|---|
| ECC | CRCm | e2e CRC | MD | TEE | MAC |
| Die |  |  |  |  |  |
| UDB | 21 |  | 16 | 3 |  |  |
| CL | 84 | 45 | 64 | 12 | 1 | 50 |

TABLE 3

| ECC per die | | | | | |
|---|---|---|---|---|---|
| ECC | CRCm | e2e CRC | MD | TEE | MAC |
| Die | 19 |  |  |  |  |  |
| UDB | 38 |  | 8 | 3 |  |  |
| CL | 152 | 31 | 32 | 12 | 1 | 28 |

Tables 1-3 shown above describes examples of different types of data having respective number of bits and corresponding to a single memory die, a single UDB, and/or a single cache line. The data illustrated in association with Tables 1-3 can be stored in a portion (e.g., the portion 764) of the memory device (e.g., the memory device 726) that is configured to store, for example, four UDBs (e.g., the UDBs 731-1, 731-2, 731-3, and 731-4 that correspond to a cache line) and in which each UDB is stored over two memory dice.

Table 1 illustrates an example scenario, in which ECC data (e.g., for providing DECTED correction/detection capability for the UDBs) and CRC data (e.g., for providing error detection capability for the UDBs) are generated based collectively on the UDBs (e.g., four UDBs 731-1, . . . , 731-4) corresponding to a cache line. As illustrated in Table 1, the ECC data for protecting the UDBs includes 27 bits and the CRC data includes 40 bits.

Table 2 illustrates an example scenario, in which ECC data (e.g., for providing DECTED correction/detection capability for each UDB and/or the UDBs) and CRC data (e.g., for providing error detection capability for the UDBs) are generated based individually on each UDB of the UDBs corresponding to a cache line. As illustrated in Table 2, ECC data for protecting each UDB includes 21 bits, which amounts to 84 bits for four UDBs, and CRC data for protecting the UDBs includes 45 bits.

Table 3 illustrates an example scenario, in which ECC (e.g., for providing DECTED correction/detection capability for data stored in each memory die, each UDB, and/or the UDBs) and CRC data (e.g., for providing error detection capability for the UDBs) are generated based individually on a portion of each UDB (of the UDBs corresponding to a cache line) corresponding to a single (e.g., each) memory die. As illustrated in Table 3, ECC data for protecting each memory die includes 19 bits, which amounts to 84 bits for four UDBs, and CRC data for protecting the UDBs includes 31 bits.

Accordingly, ECC and CRC data for protecting the UDBs corresponding to a cache line amount to 67, 129, and 183 bits in examples illustrated in association with FIGS. 1, 2, and, respectively, which indicates that ECC and CRC data have less number of bits when generated collectively on a cache-line-basis (67 bits vs 129 and/or 183 bits). Therefore, a space of the memory device 726 (e.g., the portion 767) that is spared from generating the ECC and CRC data collectively on a cache-line-basis can be configured for storing other extra data, such as MAC. For example, the spared space can be configured to store MAC data (e.g., 112 bits in the example illustrated in Table 1) as compared to MAC data respectively having 50 and 28 bits in the examples illustrated in association with FIGS. 2 and 3.

Figure 8:
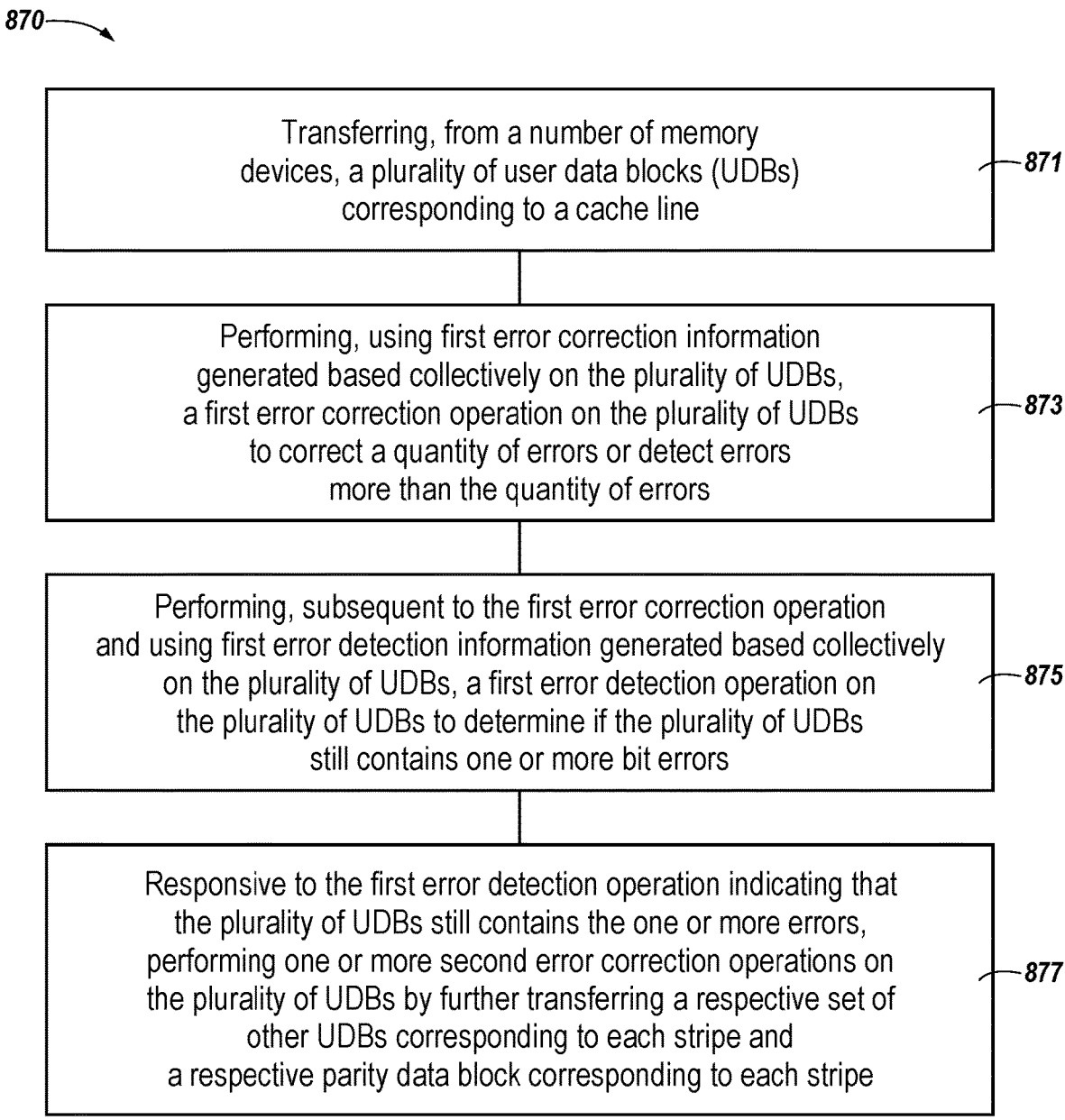
FIG. 8 is a flow diagram of a method for cache line data protection in accordance with a number of embodiments of the present disclosure.

FIG. 8 is a flow diagram 870 of a method for independent execution of write commands in accordance with a number of embodiments of the present disclosure. The method 870 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 870 is performed by the memory controller 100, 200, and/or 300 illustrated in FIGS. 1-3, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 871, a plurality of user data blocks (UDBs) (e.g., the UDBs 431, 531, 631, and/or 731 illustrated in FIGS. 4, 5, 6, and 7, respectively) corresponding to a cache line can be transferred from a number of memory devices (e.g., the memory devices 126, 226, 326, and/or 726 illustrated in FIGS. 1, 2, 3, and 7, respectively). The plurality of UDBs can belong to respective different stripes (e.g., in a similar manner illustrated in FIG. 4 and/or FIG. 5). At 873, first error correction operation can be performed on the plurality of UDBs using first error correction information generated based collectively on the plurality of UDBs. The first error correction operation corrects a quantity of errors or detects errors more than the quantity of errors.

At 875, a first error detection operation can be performed on the plurality of UDBs to determine if the plurality of UDBs still contains one or more bit errors subsequent to the first error correction operation and using first error detection information generated based collectively on the plurality of UDBs. At 877, one or more second error correction operations can be performed on the plurality of UDBs responsive to the first error detection operation indicating that the plurality of UDBs still contains the one or more errors. A respective set of other UDBs corresponding to each stripe and a respective party data block (PDB) (e.g., the PDB 433 and/or 533 illustrated in FIGS. 4-5, respectively) corresponding to each stripe can be further transferred to perform the one or more second error correction operations.

In some embodiments, a respective one of the one or more second error correction operation can be performed on each of the plurality of UDBs and each subset of the plurality of UDBs. Each subset of the plurality of UDBs includes one UDB from each stripe of the different stripes.

In some embodiments, a respective one of the one or more second error correction operations can be performed and a second error detection operation can be performed on the plurality of UDBs using the first error detection information subsequent to performing the respective one of the one or more second error correction operations. In this example, the plurality of UDBs can be transferred to a cache responsive to the second error detection operation indicating the plurality of UDBs not having an amount of bit errors, while a subsequent one of the one or more second error correction operations is further performed responsive to the second error detection operation indicating an amount of bit errors in the plurality of UDBs.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a number of memory devices; and
   a memory controller coupled to the number of memory devices, the memory controller configured to:
   receive a plurality of user data blocks (UDBs) corresponding to a cache line and belonging to different stripes, wherein the plurality of UDBs corresponding to the cache line is a data transfer unit to or from a cache;
   generate error detection information based collectively on the plurality of UDBs corresponding to the cache line;

generate error correction information based collectively on the plurality of UDBs corresponding to the cache line; and
write, along with the error detection information and error correction information, the plurality of UDBs to the number of memory devices;
read the plurality of UDBs; and
in response to the plurality of UDBs being indicated as containing one or more errors:
perform one second error correction operation on a first subset of the plurality of UDBs using a first parity data block; and
perform, independently of the one second error correction operation, another second error correction operation on a second subset of the plurality of UDBs using a second parity data block.

2. The apparatus of claim 1, wherein the memory controller is further configured to:
write each of the plurality of UDBs to a first portion of a respective memory device of the number of memory devices, wherein the first portion of each of the number of memory devices comprises a number of data pins; and
write the error detection information and the error correction information to one or more second portions of the respective memory devices of the number of memory devices, wherein the second portion of each of the number of memory devices comprises a number of data mask inversion (DMI) pins.

3. The apparatus of claim 1, wherein:
the number of memory devices are coupled to the memory controller via a number of channels respectively; and
the memory controller is configured to write the plurality of UDBs to one or more memory devices coupled to a same channel of the number of channels.

4. The apparatus of claim 1, wherein each stripe is a unit of redundant array of independent disks (RAID) access.

5. The apparatus of claim 1, wherein the plurality of UDBs are received as part of different write commands.

6. The apparatus of claim 1, wherein the plurality of UDBs corresponding to a cache line includes at least two UDBs from each of the stripes.

7. The apparatus of claim 1, wherein the error detection information corresponds to cyclic redundancy check (CRC) data.

8. An apparatus, comprising:
a number of memory devices; and
a memory controller coupled to the number of memory devices, the memory controller configured to:
receive, from the number of memory devices, a plurality of user data blocks (UDBs) corresponding to a cache line, wherein the plurality of UDBs belong to respective different stripes;
perform, to correct a quantity of bit errors within the plurality of UDBs, a first error correction operation collectively on the plurality of UDBs using error correction information generated based collectively on the plurality of UDBs; and
perform, to determine whether to perform one or more second error correction operations on the plurality of UDBs, a first error detection operation collectively on the plurality of UDBs using error detection information generated based collectively on the plurality of UDBs; and
responsive to the first error detection operation indicating that the plurality of UDBs still contains one or more errors:
perform one second error correction operation on a first subset of the plurality of UDBs using a first parity data block; and
perform, independently of the one second error correction operation, another second error correction operation on a second subset of the plurality of UDBs using a second parity data block.

9. The apparatus of claim 8, wherein the memory controller is configured to perform one or more second error detection operations subsequent to the second error correction operations performed on the first and second subsets of the plurality of UDBs.

10. The apparatus of claim 8, wherein the memory controller is configured to:
responsive to the second error detection operation indicating the plurality of UDBs not having an amount of bit errors, transfer the plurality of UDBs to a cache; and
responsive to the second error detection operation indicating the plurality of UDBs having an amount of bit errors, perform a subsequent error detection operation of the one or more second error detection operations on the plurality of UDBs.

11. The apparatus of claim 8, wherein the memory controller is configured to cause the number of memory devices to:
transfer the plurality of UDBs to the memory controller via a number of data pins; and
transfer, contemporaneously with the transfer of the plurality of UDBs, the error correction information or the error detection information to the memory controller via a number of data mask inversion (DMI) pins.

12. The apparatus of claim 8, wherein the memory controller is configured to perform, to recover one or more UDBs of the plurality of UDBs, the second error correction operations responsive to the first error detection operation indicating an amount of bit errors in the plurality of UDBs.

13. The apparatus of claim 12, wherein at least one of the second error correction operations correspond to a redundant array of independent disks (RAID) operation.

14. The apparatus of claim 12, wherein the plurality of UDBs corresponding to a cache line includes at least two UDBs from each of the stripes.

15. The apparatus of claim 14, wherein the controller is configured to perform a respective one of a number of second error correction operations individually on each user block of the number of user blocks.

16. The apparatus of claim 14, wherein the controller is configured to perform a respective one of a number of second error correction operations collectively on each subset of the plurality of UDBs, wherein each subset includes one UDBs from each stripe.

17. A method, comprising:
transferring, from a number of memory devices, a plurality of user data blocks (UDBs) corresponding to a cache line, wherein the plurality of UDBs belong to respective different stripes;
performing, using first error correction information generated based collectively on the plurality of UDBs, a first error correction operation on the plurality of UDBs to correct a quantity of errors or detect errors more than the quantity of errors;
performing, subsequent to the first error correction operation and using first error detection information generated based collectively on the plurality of UDBs, a first error detection operation on the plurality of UDBs to determine if the plurality of UDBs still contains one or more bit errors; and responsive to the first error detection operation indicating that the plurality of UDBs still contains the one or more errors;
  performing one second error correction operation on a first subset of the plurality of UDBs using a first parity data block; and
  performing, independently of the one second error correction operation, another second error correction operation on a second subset of the plurality of UDBs using a second parity data block.

18. The method of claim 17, wherein;
the first subset of the plurality of UDBs corresponds to a first stipe of the different stripes; and
the second subset of the plurality of UDBs corresponds to a second stipe of the different stripes.

19. The method of claim 17, further comprising:
performing a second error detection operation on the plurality of UDBs using the first error detection information subsequent to performing the second error correction operations on the first and second subsets of the plurality of UDBs independently.

20. The method of claim 19, further comprising:
responsive to the second error detection operation indicating the plurality of UDBs not having an amount of bit errors, transferring the plurality of UDBs to a cache; and
responsive to the second error detection operation indicating an amount of bit errors in the plurality of UDBs, performing a subsequent one of the second error correction operations on the first and second subsets of the plurality of UDBs independently.

* * * * *